United States Patent
Ruitenburg

(10) Patent No.: US 6,252,633 B1
(45) Date of Patent: Jun. 26, 2001

(54) TELEVISION SIGNAL RECEIVER

(75) Inventor: Leo Ruitenburg, Swalmen (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/108,644

(22) Filed: Jul. 1, 1998

(30) Foreign Application Priority Data

Jul. 3, 1997 (DE) .............................................. 197 28 315

(51) Int. Cl.$^7$ ................................ H04N 5/44; H04N 5/50
(52) U.S. Cl. ........................ 348/725; 348/731; 455/180.1
(58) Field of Search .................................. 348/725, 726, 348/737, 731, 732, 733, 705, 706; 455/133, 134, 135, 137, 188.1, 188.2, 189.1, 180.1, 180.2; H04N 5/44, 5/455, 5/50

(56) References Cited

U.S. PATENT DOCUMENTS

| | | | | |
|---|---|---|---|---|
| 5,577,270 | * | 11/1996 | Sakai | 455/180.1 |
| 5,867,771 | * | 2/1999 | Ruitenburg | 455/189.1 |
| 6,094,229 | * | 7/2000 | Ohshima | 348/736 |

FOREIGN PATENT DOCUMENTS

0492914A2 * 6/1991 (EP) .

* cited by examiner

Primary Examiner—Reinhard J. Eisenzopf
Assistant Examiner—Brian P. Yenke

(57) ABSTRACT

To simplify the circuitry in a television signal receiver having a radio-frequency tuner (1) and at least two subsequent surface-acoustic wave filters (2, 3), in which the radio-frequency tuner (1) filters a radio frequency television signal applied to its input and converts it to an intermediate-frequency television signal which is coupled to the surface-acoustic wave filter (2, 3), the radio-frequency tuner (1) has at least two outputs (6, 7) which supply the IF television signal converted to the intermediate frequency. Each output (6, 7) is associated with a switch (8, 9) for switching the associated output (6, 7) to a fixed reference potencial. A first input (10; 12) of the two surface-acoustic wave filters (2, 3) is coupled to a first output (6) of the radio-frequency tuner (1), and a second input (11; 13) of the two surface-acoustic wave filters (2, 3) is coupled to a second output (7) of the radio-frequency tuner (1). For switching the filter characteristic of the television signal receiver, alternately one of the outputs (6; 7) of the radio-frequency tuner (1) and the inputs (10, 12; 11, 13) coupled thereto of the surface-acoustic wave filters (2, 3) can be coupled to the reference potential by the associated switch (8; 9).

7 Claims, 1 Drawing Sheet

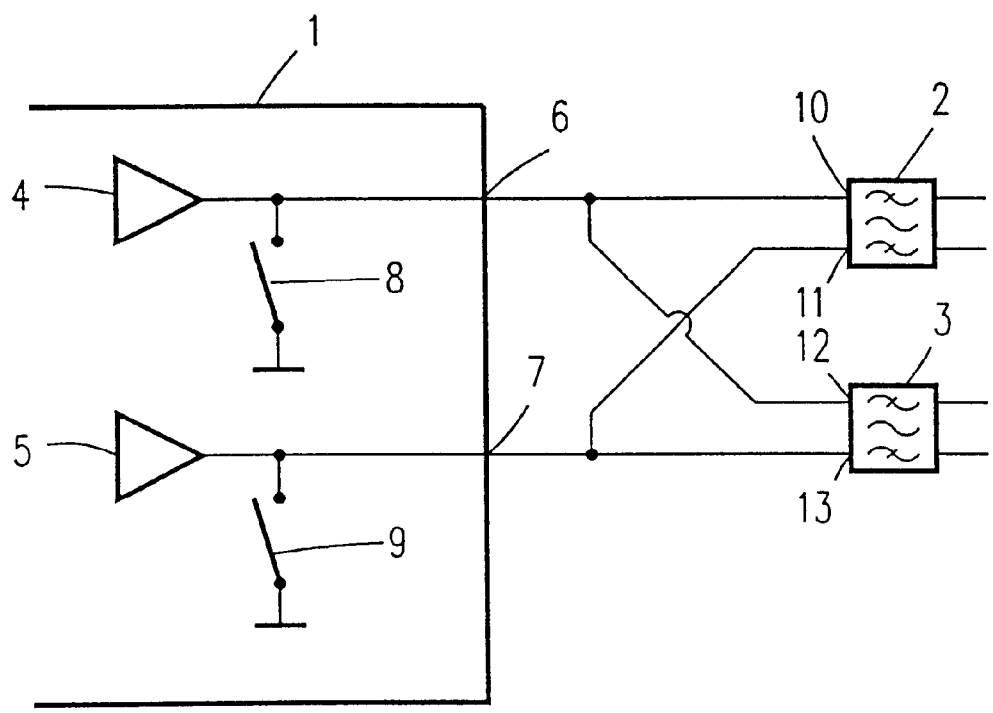

TELEVISION SIGNAL RECEIVER

BACKGROUND OF THE INVENTION

1. Field of the Invention

The invention relates to a television signal receiver comprising a radio-frequency tuner and at least two subsequent surface-acoustic wave filters, in which the radio-frequency tuner filters a radio frequency television signal applied to its input and converts it to an intermediate-frequency television signal which is coupled to the surface-acoustic wave filter.

2. Description of the Related Art

Such television signal receivers are particularly implemented with a plurality of surface-acoustic wave filters for receiving radio-frequency television signals of different transmission standards. These surface-acoustic wave filters are activated or deactivated by means of associated switches. There are also concepts in which the filter characteristics of the surface-acoustic wave filters are switched in such a way that different inputs of the surface-acoustic wave filters are switched to a reference potential. The drawback of both concepts is the multitude of required switches and the attendant elaborate number of components.

SUMMARY OF THE INVENTION

It is an object of the invention to reduce the number of components for such a television signal receiver for multistandard reception.

According to the invention, this object is solved in that the radio-frequency tuner has at least two outputs which supply the IF television signal converted to the intermediate frequency, in that each output is associated with a switch by means of which the associated output is switchable to a fixed reference potential, in that the radio-frequency tuner precedes at least two surface-acoustic wave filters, in which each time, a first input of the two surface-acoustic wave filters is coupled to a first output of the radio-frequency tuner, and a second input of the two surface-acoustic wave filters is coupled to a second output of the radio-frequency tuner, and in that, for switching the filter characteristic of the television signal receiver, alternately one of the outputs of the radio-frequency tuner and the inputs coupled thereto of the surface-acoustic wave filters can be coupled to the reference potential by means of the associated switch.

In this concept, according to the invention, the radio-frequency tuner has at least two outputs, both of which supply the RF television signal converted to the intermediate frequency. Each output is associated with a switch by means of which the associated output is switchable to a reference potential.

For example, in a concept with two outputs of the RF tuner, subsequently arranged surface-acoustic wave filters have one of their inputs connected to an output of the RF tuner. The switches associated with the outputs of the RF tuner provide the possibility of a switch-over or switch on/off of the surface-acoustic wave filters, dependent on their construction. In this way, the filter characteristic of the television signal receiver can be switched, for which purpose, only the two switches associated with the outputs are required.

In the case of activated switches, the associated output is low-ohmic and, in addition to the deactivation of this output, it simultaneously allows a switch-over or switch on/off of the subsequent surface-acoustic wave filters.

On the one hand, this leads to a reduction of the number of required switches and, on the other hand, these switches can be constructed together with the RF tuner because they are associated with the outputs of this tuner.

In accordance with an embodiment of the invention, at least one of the surface-acoustic wave filters is implemented in such a way that its filter characteristic changes in dependence upon which of its inputs is coupled to reference potential, and in that the filter characteristic of the surface-acoustic wave filter is switchable by means of the switches associated with the outputs of the radio-frequency tuner.

Surface-acoustic wave filters of this type have two inputs, both of which can receive signals to be filtered. Alternatively, however, one of the inputs must be connected to a reference potential, which leads to a switch of the filter characteristic of the surface-acoustic wave filter. The other input then remains an active input, whose input signal is filtered with the corresponding, activated filter characteristic. In the television signal receiver according to the invention, such filters have one of their inputs connected to one of the outputs which are switchable at a low-ohmic value. Due to the alternative activation of the switches associated with the outputs of the RF tuner, the filter characteristic of such a surface-acoustic wave filter is switched in a simple manner.

A further embodiment of the invention is characterized in that at least one of the surface-acoustic wave filters is implemented in such a way that the filter can be cut off in dependence upon which of its inputs is coupled to reference potential, and in that the surface-acoustic wave filter can be cut off by means of the switches associated with the outputs of the radio-frequency tuner. In this type of switch, the surface-acoustic wave filter can be switched on/off by the switches associated with the outputs of the RF tuner, which filter can thus be cut off or activated by means of the switches.

Surface-acoustic wave filters of both these types may be combined in a circuit arrangement according to the invention. In the television signal receiver according to the invention, this leads to a smaller number of components, even when a complex construction is used, i.e., a multitude of such filters and switchable filter characteristics, because the number of switches required is dependent on the number of outputs of the RF tuner.

This advantage of the television signal receiver according to the invention becomes particularly manifest when switching operations between a multitude of filter characteristics have to be performed. This is the case, for example, in multistandard television receivers in which the surface-acoustic wave filter must be adjustable to each of the receivable television signals of different standards.

To this end, a further embodiment of the invention is characterized in that said television signal receiver is a multistandard television signal receiver for receiving television signals of different transmission standards, and in that the surface-acoustic wave filters and their filter characteristics for adaptation to IF television signals of different transmission standards are switchable by means of the switches.

The simplification of the circuitry obtained in the television signal receiver according to the invention may be further increased in that, in accordance with another embodiment, both outputs and the associated switches of the radio-frequency tuner are implemented on an integrated circuit.

These and other aspects of the invention are apparent from and will be elucidated with reference to the embodiments described hereinafter.

BRIEF DESCRIPTION OF THE DRAWING

In the drawing:

The sole FIGURE shows a television signal receiver according to the invention, comprising an RF tuner 1 which is shown only partially.

DESCRIPTION OF THE PREFERRED EMBODIMENT

The FIGURE shows an RI tuner 1 having an output amplifier 4 which supplies an intermediate-frequency television signal. This IF television signal is acquired in a manner not shown in the FIGURE from an RF television signal applied to the input of the RF tuner by conversion to the intermediate-frequency range.

A second amplifier 5 arranged in the RF tuner 1 supplies the same IF television signal.

A first switch 8, by means of which the IF television signal at the output of the amplifier 4 can be coupled to reference potential, is associated with the first amplifier 4. A first output 6 of the RF tuner is coupled to the output of the amplifier 4 and the switch 8. By means of the switch 8, the output 6 can be switched in such a way that it alternately conveys the IF television signal or is low-ohmic coupled to the reference potential.

A switch 9, by means of which a second output 7 of the RF tuner 1 associated with the amplifier 5 is also alternately switchable to the IF television signal or is low-ohmic coupled to the reference potential, is associated with the second amplifier 5.

By means of the switches 8 and 9, the outputs 6 and 7 of the RF tuner 1 can be individually switched in such a way that they convey either the IF television signal or are low-ohmic coupled to the reference potential.

The television signal receiver shown in the FIGURE also has two surface-acoustic wave (SAW) filters 2 and 3.

The first SAW filter 2 has a first input 10 which is coupled to the first output 6 of the RF tuner 1. The first SAW filter 2 further has a second input 11 which is coupled to the second output 7 of the RF tuner 1.

In a corresponding manner, a first input 12 of the second SAW filter 3 is coupled to the first input 5 of the RF tuner, and a second input 13 of this SAW filter is coupled to the second output 7 of the RF tuner 1.

The two SAW filters 2 and 3 have different constructions.

The first SAW filter 2 is implemented in such a way that its filter characteristic is switched in dependence upon which of its inputs 10 or 11 is coupled to reference potential. For example, if switch 8 is activated and thus the first input of the SAW filter 2 is coupled to reference potential, the signal applied to the second input 11 of the SAW filter 2 is filtered with a first filter characteristic. If, on the other hand, the switch 9 is activated and thus the second input 11 of the SAW filter 2 is coupled to reference potential, the signal applied to the first input 10 of the SAW filter 2 is filtered with a second filter characteristic.

This example shows that the filter characteristic of the SAW filter 2 is switchable by switching the switches 8 and 9 at the outputs of the RF tuner 1.

However, the switches 8 and 9 may also be used for switching the SAW filter 3 on or off. The SAW filter 3 has a different construction than the SAW filter 2. The SAW filter 3 may be activated or deactivated dependent on whether its second input 13 is coupled or not coupled to reference potential.

Thus, if the switch 9 is activated and hence the second input of the SAW filter 3 is coupled to reference potential, this filter is cut off. If, on the other hand, the switch 8 is activated and the switch 9 is open, the SAW filter 3 filters the signals applied to its second input 13 and supplies them at the output in a filtered form.

It is apparent from this simple example that the switches 8 and 9 may trigger a plurality of functions. Particularly, the filter characteristics of a plurality of surface-acoustic wave filters can be switched or activated or deactivated by means of the switches. This reduces the number of switches as compared with state-of-the-art circuit arrangements. By associating the switches with the outputs 6 and 7 of the RF tuner and its amplifiers 4 and 5, the switches can be built up together with these amplifiers in a possibly integrated form, so that this leads to a further simplification.

What is claimed is:

1. A television signal receiver comprising a radio-frequency tuner and at least two subsequent surface-acoustic wave filters, in which the radio-frequency tuner filters a radio frequency television signal applied to its input and converts it to an intermediate-frequency television signal which is coupled to the surface-acoustic wave filters, characterized in that the radio-frequency tuner has at least two outputs for supplying the IF television signal converted to the intermediate frequency, and at least two switches coupled, respectively, to said at least two outputs for switching, respectively, said at least two outputs to a fixed reference potential, said at least two subsequent surface-acoustic wave filters each having a first input coupled to a first output of said at least two outputs of the radio-frequency tuner, and a second input coupled to a second output of said at least two outputs of the radio-frequency tuner, wherein for switching a filter characteristic of the television signal receiver, alternatively, one of the at least two outputs of the radio-frequency tuner and, consequently, the respective inputs of the at least two subsequent surface-acoustic wave filters is switchably coupleable to the reference potential by the respective switch.

2. A television signal receiver as claimed in claim 1, characterized in that a filter characteristic of at least one of the at least two subsequent surface-acoustic wave filters is changeable in dependence upon which of the first and second inputs is coupled to the reference potential, wherein the filter characteristic of said at least one surface-acoustic wave filter is changeable by the at least two switches coupled to the at least two outputs of the radio-frequency tuner.

3. A television signal receiver as claimed in claim 1, characterized in that at least one of the at least two subsequent surface-acoustic wave filters is cut off when one of said first and second inputs is coupled to the reference potential, wherein the at least one surface-acoustic wave filter is cut off by the at least two switches coupled to the at least two outputs of the radio-frequency tuner.

4. A television signal receiver as claimed in claim 1, characterized in that said television signal receiver is a multistandard television signal receiver for receiving television signals of different transmission standards, wherein filter characteristics of the at least two surface-acoustic wave filters, for adapting the television signal receiver to IF television signals of different transmission standards, are switchable by the at least two switches.

5. A television signal receiver as claimed in claim 1, characterized in that said at least two outputs and the at least two switches of the radio-frequency tuner are implemented on an integrated circuit.

6. A television apparatus including a television signal receiver as claimed in claim 1.

7. A video recorder including a television signal receiver as claimed in claim 1.

* * * * *